(12) United States Patent
Xu et al.

(10) Patent No.: US 10,476,678 B2
(45) Date of Patent: Nov. 12, 2019

(54) METHODS AND SYSTEMS FOR HIGH THROUGHPUT AND CYBER-SECURE DATA COMMUNICATIONS

(71) Applicant: Intelligent Fusion Technology, Inc, Germantown, MD (US)

(72) Inventors: Yiran Xu, Germantown, MD (US); Gang Wang, Germantown, MD (US); Sixiao Wei, Germantown, MD (US); Genshe Chen, Germantown, MD (US); Khanh Pham, Germantown, MD (US); Erik Blasch, Germantown, MD (US)

(73) Assignee: INTELLIGENT FUSION TECHNOLOGY, INC., Germantown, MD (US)

( * ) Notice: Subject to any disclaimer, the term of this patent is extended or adjusted under 35 U.S.C. 154(b) by 235 days.

(21) Appl. No.: 15/469,667

(22) Filed: Mar. 27, 2017

(65) Prior Publication Data

US 2018/0278425 A1 Sep. 27, 2018

(51) Int. Cl.
| | |
|---|---|
| *H04L 9/32* | (2006.01) |
| *H04L 29/06* | (2006.01) |
| *H04W 12/04* | (2009.01) |
| *H04W 28/04* | (2009.01) |
| *H03K 9/00* | (2006.01) |

(Continued)

(52) U.S. Cl.
CPC ........ *H04L 9/3247* (2013.01); *H04L 63/0823* (2013.01); *H04L 63/123* (2013.01); *H04W 28/04* (2013.01); *H03K 7/00* (2013.01); *H03K 9/00* (2013.01); *H04L 27/00* (2013.01); *H04W 12/04* (2013.01)

(58) Field of Classification Search
CPC ......... H04L 27/00; H04L 63/123; H03K 7/00; H03K 9/00
See application file for complete search history.

(56) References Cited

U.S. PATENT DOCUMENTS

| | | | |
|---|---|---|---|
| 4,138,678 A * | 2/1979 | Kirner | G01S 1/022 342/169 |
| 2006/0156009 A1* | 7/2006 | Shin | H04L 63/123 713/176 |

(Continued)

FOREIGN PATENT DOCUMENTS

WO 2016070657 A1 5/2016

*Primary Examiner* — Daniel B Potratz
(74) *Attorney, Agent, or Firm* — Anova Law Group, PLLC

(57) ABSTRACT

Methods and systems for cyber secure data communications are provided. In some embodiments, a method for transmitting data comprises: performing a marker-based data encoding process to embed a digital watermark into each of a plurality of original data flows to be transmitted to a plurality of receivers; performing a non-orthogonal multiple access process to allocate transmission powers to the plurality of original data flows, such that the plurality of original data flows are simultaneously superposed on a carrier frequency to generate a superposed signal; performing a noise modulation process to modulate the superposed signal to generate a noise-like signal and a reference noise signal; transmitting the noise-like signal and the reference noise signal through orthogonally polarized antennas; and performing a portal-based data integrity analysis process to check whether a receiver in the plurality of receivers is compromised or manipulated.

20 Claims, 8 Drawing Sheets

(51) Int. Cl.
*H04L 27/00* (2006.01)
*H03K 7/00* (2006.01)

(56) References Cited

U.S. PATENT DOCUMENTS

| | | | |
|---|---|---|---|
| 2013/0159722 A1* | 6/2013 | Goergen | H04N 1/32144 |
| | | | 713/176 |
| 2014/0314006 A1 | 10/2014 | Suh et al. | |
| 2017/0155484 A1* | 6/2017 | Kang | H04L 1/06 |
| 2017/0346598 A1* | 11/2017 | Robert Safavi | H04J 11/0043 |
| 2018/0041321 A1* | 2/2018 | Guo | H04L 5/0048 |
| 2019/0140750 A1* | 5/2019 | Schober | H04W 72/042 |
| 2019/0165972 A1* | 5/2019 | Lee | H04J 11/004 |

* cited by examiner

METHODS AND SYSTEMS FOR HIGH THROUGHPUT AND CYBER-SECURE DATA COMMUNICATIONS

GOVERNMENT RIGHTS

This invention was made with Government support under Contract No. FA9453-16-C-0428, awarded by the United States Air Force Research Laboratory. The U.S. Government has certain rights in the present disclosure.

TECHNICAL FIELD

The present disclosure generally relates to the field of communication systems, and more particularly, relates to methods and systems for data communications.

BACKGROUND

Global information exchange and services depends on reliable, secure, and rapid cyber operations. Efficient and effective information flow with agility and integrity is desired in global information grid (GIG) cyber domains, which operate within cyber-attack environments and require high-security communications.

There are various cyber-attack environments such as devices to transmission channels. For example, network devices can include compromised nodes where the information flow may be intercepted, deceived, and destroyed. As another example, a spatial area may have high density interference operations in the wireless domain. As yet another example, external interceptors may analyze network traffic activity to make the network transmission channels consistently denied services.

Accordingly, it is desirable to provide methods and systems for cyber secure data communications.

BRIEF SUMMARY

An aspect of the present disclosure provides a method for transmitting data, comprising: performing a marker-based data encoding process to embed a digital watermark into each of a plurality of original data flows to be transmitted to a plurality of receivers respectively; performing a non-orthogonal multiple access (NOMA) process to allocate transmission powers to the plurality of original data flows respectively, such that the plurality of original data flows are be superposed on a carrier frequency simultaneously to generate a superposed signal; performing a noise modulation process to modulate the superposed signal to generate a noise-like signal and a reference noise signal; transmitting the noise-like signal and the reference noise signal through orthogonally polarized antennas; and performing a portal-based data integrity analysis process to check whether a receiver in the plurality of receivers is compromised or manipulated.

In some embodiments, the marker-based data encoding process includes: generating the digital watermark including an identical watermark and a synchronized watermark for each of the plurality of original data flows; and embedding the digital watermark at random time instants into one corresponding original data flow.

In some embodiments, the non-orthogonal multiple access process includes: clustering the plurality of receivers with a plurality of channel gains respectively; calculating channel gain differences based on the plurality of channel gains; allocating the transmission powers to the plurality of receivers using the channel gain differences; and generating the superposed signal based on the transmission powers.

In some embodiments, the plurality of channel gains of the plurality of receivers are respectively normalized by a corresponding channel noise; and the transmission power allocated to each of the plurality of receivers is inversely proportional to the corresponding channel gain normalized by the corresponding channel noise.

In some embodiments, the noise modulation process includes: generating a band-limited Gaussian noise characterized by a first key; using a power divider to split the band-limited Gaussian noise into a first noise and a second noise; modulating the superposed signal with the first noise to obtain the noise-like signal; and using a second key to delay the second noise to obtain the reference noise signal.

In some embodiments, transmitting the noise-like signal and the reference noise signal includes: broadcasting the noise-like signal on a first frequency to the plurality of receivers through a first polarized antenna; and broadcasting the reference signal at a second frequency to the plurality of receivers through a second polarized antenna; wherein the first frequency is different from the second frequency, and a signal polarization direction of the first polarized antenna is perpendicular to a signal polarization direction of the second polarized antenna.

In some embodiments, the portal-based data integrity analysis process includes: deploying a data source to dynamically generate original testing data; configuring a portal node to distribute the original testing data; sending a first portion the original testing data via the portal node through a first flow path including the plurality receivers arranged in a first queue; sending a second portion of the original testing data to a second flow path including the plurality of receivers arranged in a second queue, wherein the second portion of the original testing data is a duplication of the first portion of the original testing data, and a pair of corresponding receivers that have a same serial number in the first flow path and the second flow path which share a same data processing function; comparing intermediate data process results between each pair of corresponding receivers; and determining whether one receiver in the plurality of receivers is compromised or manipulated based on the comparison results.

Another aspect of the present disclosure provides a method for receiving data, comprising: receiving a noise-like signal and a reference noise signal through orthogonally polarized antennas; performing a noise demodulation process to recover a superposed signal from the noise-like signal and a reference noise signal, wherein the superposed signal includes a plurality of data flows for a plurality of receivers superposed on a carrier frequency; performing a successive interference cancellation process to decode an intended data flow for one of the plurality of receivers; performing a marker-based data decoding process to check correlation validation by using the intended data flow and a digital watermark to determine whether the intended data flow is manipulated; and performing a portal-based data integrity attestation process to initiate a data processing function for checking whether the receiver is compromised or manipulated.

In some embodiments, receiving the noise-like signal and the reference noise signal includes: receiving the noise-like signal on a first frequency through a first polarized antenna and amplifying the noise-like signal; and receiving the reference signal at a second frequency through a second polarized antenna and amplifying the reference signal; wherein the first frequency is different from the second frequency, and a signal polarization direction of first polarized antenna is perpendicular to a signal polarization direction of a second polarized antenna.

In some embodiments, the noise demodulation process includes: synchronizing the noise-like signal and the reference noise signal with a pre-defined delay time parameter to obtain a mixed signal; and retrieving a sum frequency component from the mixed signal to recover the superposed signal.

In some embodiments, the successive interference cancellation process includes: decoding the superposed signal in a ranking order of a plurality of channel gains normalized by a corresponding channel noise; subtracting a decoded signal component from the superposed signal; and treating other signal components based on the ranking order as interference.

In some embodiments, the marker-based data decoding process includes: performing a watermark recognizing operation to decode the intended data flow by using the digital watermark; and checking a correlation validation between the decoded intended data flow and an original data flow to determine whether the intended data flow is manipulated.

In some embodiments, the portal-based data integrity attestation process includes: receiving first input testing data from a first previous node in a first flow path; receiving second input testing data from a second previous node in a second flow path; performing a first data processing function based on the first input testing data to generate first output testing data; performing a second data processing function based on the second input testing data to generate second output testing data; sending the first output testing data to a first next node in the first flow path; and sending second input testing data from a second next node in the second flow path.

Another aspect of the present disclosure provides a system comprising at least one receiver, the receiver comprising: a signal receiving module configured to receive a noise-like signal and a reference noise signal through orthogonally polarized receiving antennas; a noise demodulation module configured to perform a noise demodulation process to recover a superposed signal from the noise-like signal and a reference noise signal, wherein the superposed signal includes a plurality of data flows for a plurality of receivers superposed on a carrier frequency; a successive interference cancellation module configured to perform a successive interference cancellation process to decode an intended data flow for one of the plurality of receivers; a marker-based data decoding module configured to perform a marker-based data decoding process to check correlation validation by using the intended data flow and a first digital watermark; and a portal-based data integrity attestation configured to perform a portal-based data integrity attestation process to operate a data processing function for checking whether the receiver is compromised or manipulated.

In some embodiments, the signal receiving module is further configured to: receive the noise-like signal on a first frequency through a first polarized receiving antenna and amplifying the noise-like signal, and receive the reference signal at a second frequency through a second polarized receiving antenna and amplifying the reference signal, wherein the first frequency is different from the second frequency, and a signal polarization direction of the first polarized receiving antenna is perpendicular to a signal polarization direction of the second polarized receiving antenna.

In some embodiments, the noise demodulation module is further configured to: synchronize the noise-like signal and the reference noise signal with a pre-defined delay time parameter to obtain a mixed signal, and retrieve a sum frequency component from the mixed signal to recover the superposed signal.

In some embodiments, the successive interference cancellation module is further configured to: decode the superposed signal in a ranking order of a plurality of channel gains normalized by a corresponding channel noise, subtract a decoded signal component from the superposed signal, and treat other signal components based on the ranking order as interference.

In some embodiments, the marker-based data decoding module is further configured to: perform a watermark recognizing operation to decode the intended data flow by using the first digital watermark, and check a correlation validation between the decoded intended data flow and an original data flow to determine whether the intended data flow is compromised or manipulated.

In some embodiments, the portal-based data integrity attestation module is further configured to: receive first input testing data from a first previous node in a first flow path; receive a second input testing data from a second previous node in a second flow path; perform a first data processing function based on the first input testing data to generate first output testing data; perform a second data processing function based on the second input testing data to generate a second output testing data; send the first output testing data to a first next node in the first flow path; and send a second input testing data from a second next node in the second flow path.

In some embodiments, the system further includes a transmitter, the transmitter comprising: a marker-based data encoding module configured to perform a marker-based data encoding process to embed a digital watermark into each of the plurality of original data flows to be transmitted to the plurality of receivers respectively; a multi-user superposition module configured to perform a non-orthogonal multiple access process to allocate transmission powers to the plurality of original data flows, such that the plurality of original data flows are simultaneously superposed on the carrier frequency to generate the superposed signal; a noise modulation module configured to perform a noise modulation process to modulate the superposed signal to generate the noise-like signal and the reference noise signal; a signal polarization and transmission module configured to transmit the noise-like signal and the reference noise signal through orthogonally polarized antennas; and a portal-based data integrity analysis module configure to perform a portal-based data integrity analysis process to check whether a receiver in the plurality of receiver is compromised or manipulated.

In some embodiments, the marker-based data encoding module is further configured to: generate the digital watermark including an identical watermark and a synchronized watermark for each of the plurality of original data flows; and embed the digital watermark at random time instants into one corresponding original data flow.

In some embodiments, the multi-user superposition module is further configured to: cluster the plurality of receivers with the plurality of channel gains; calculate channel gain differences base on the plurality of channel gains; allocate the transmission powers to the plurality of receivers using the channel gain differences; and generate the superposed signal based on the transmission powers; wherein the plurality of channel gains of the plurality of receivers are respectively normalized by a corresponding channel noise, and the transmission power allocated to each of the plurality of receivers is inversely proportional to the corresponding channel gain normalized by the corresponding channel noise.

In some embodiments, the noise modulation module is further configured to: generate a band-limited Gaussian noise characterized by a first key, use a power divider to split the band-limited Gaussian noise into a first noise and a second noise, modulate the superposed signal with the first noise to obtain the noise-like signal, and use a second key to delay the second noise to obtain the reference noise signal.

In some embodiments, the signal polarization and transmission module is further configured to: broadcast the noise-like signal on the first frequency to the plurality of receivers through a first polarized transmitting antenna, and broadcast the reference signal at the second frequency to the plurality of receivers through a second polarized transmitting antenna, wherein the first frequency is different from the second frequency, and a signal polarization direction of the first polarized transmitting antenna is perpendicular to a signal polarization direction of the second polarized transmitting antenna.

In some embodiments, the portal-based data integrity analysis module is further configured to: deploy a data source to dynamically generate original testing data; configure a portal node to distribute the original testing data; send a first portion the original testing data via the portal node to the first flow path including the plurality of receivers arranged in a first queue; send a second portion of the original testing data to the second flow path including the plurality of receivers arranged in a second queue, wherein the second portion of the original testing data is a duplication of the first portion of the original testing data, and a pair of corresponding receivers that have a same serial number in the first flow path and the second flow path respectively share a same data processing function; compare intermediate data process results between each pair of corresponding receivers; and determine whether one receiver in the plurality of receivers is compromised or manipulated based on the comparison results.

Other aspects of the present disclosure can be understood by those skilled in the art in light of the description, the claims, and the drawings of the present disclosure.

BRIEF DESCRIPTION OF THE DRAWINGS

Various objects, features, and advantages of the present disclosure can be more fully appreciated with reference to the following detailed description of the present disclosure when considered in connection with the following drawings, in which like reference numerals identify like elements. It should be noted that the following drawings are merely examples for illustrative purposes according to various disclosed embodiments and are not intended to limit the scope of the present disclosure.

DETAILED DESCRIPTION

Figure 1:
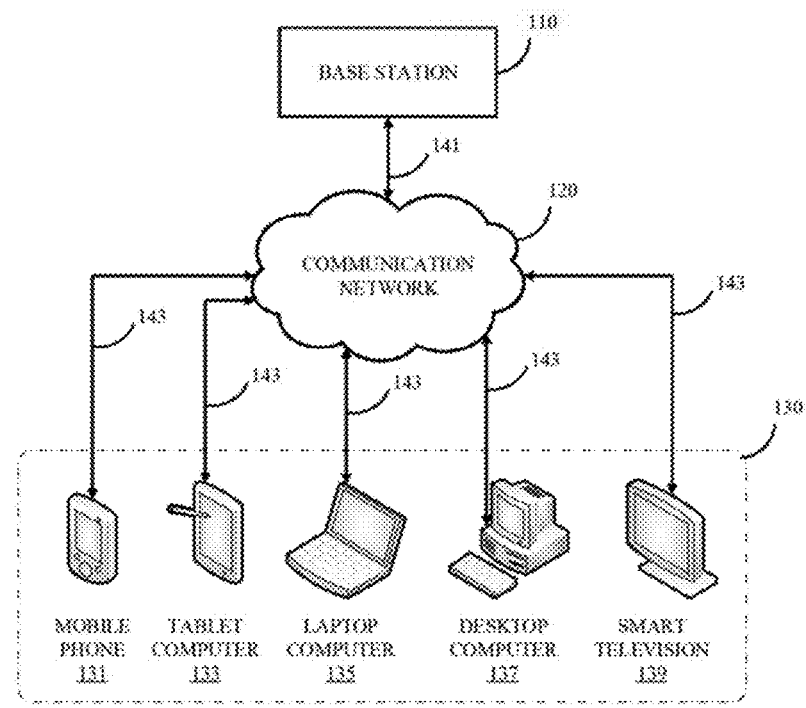
FIG. 1 illustrates a schematic block diagram of an exemplary high throughput and cyber secure communication system in accordance with some embodiments of the present disclosure.

For those skilled in the art to better understand the technical solution of the present disclosure, reference will now be made in detail to exemplary embodiments of the present disclosure, which are illustrated in the accompanying drawings. Wherever possible, the same reference numbers will be used throughout the drawings to refer to the same or like parts.

In accordance with various embodiments of the present disclosure, methods and systems for cyber-secure data communications are provided. For example, a high throughput and cyber secure communication method, and a high throughput and cyber secure communication system are provided in the present disclosure. The disclosed high throughput and cyber secure communication method and system can enhance information access in either cyber-attack or high-security environments.

In high-security environments with the potential of varied cyber-attacks, the disclosed high throughput and cyber secure communication method and system can validate the originality of the information before data transmission and check whether the collected information is compromised or manipulated during transmission at the receiver side.

In some embodiments, the disclosed high throughput and cyber secure communication method can apply advanced access technologies for information collection, data transmission, and secure communications in cyber-attack environments. In the disclosed high throughput and cyber secure communication system, a central control station can communicate with multiple distributed nodes with limited network resources.

Further, the disclosed high throughput and cyber secure communication system can include a noise modulated multi-user superposition communication (MuSC) sub-system to enable the transmitter to send a noise-like superposed signal to multiple users simultaneously over the same spectrum.

The noise modulated MuSC sub-system can apply a NOMA operation to explore the wireless channel characteristics and power levels to superpose more than one layer of data transmission within a beam of energy for multiple users in the system. Such non-orthogonal transmission can allow multiple users to share the same resource elements without spatial separation, and improve the multiuser system capacity without increasing bandwidth.

The noise modulated MuSC sub-system can further apply a band-limited Gaussian noise to modulate the superposed signal to a noise-like signal, and to transmit the noise-like signal with the noise signal over orthogonal polarization channels. Such a polarization diversity design can enable the transmitted signal to appear as un-polarized noise in the time domain, and can hide the signal spectrum under the ambient noise in the frequency domain.

In some embodiments, the disclosed high throughput and cyber secure communication method can apply a marker-based data validation (MDV) technique to authenticate the originality of the transmission data. The data-level watermark technique can operate with low cost, self-intelligence, and high efficiency when dealing with streaming large scale data.

In some embodiments, the disclosed high throughput and cyber secure communication system can include multiple users as the receivers, so the disclosed high throughput and cyber secure communication method can further apply a portal-based data attestation (PDA) technique in the multi-user systems to expose dishonest or malicious parties. As a system-level intelligent management technique, the PDA technique can use a low-cost data attestation mechanism to dynamically and intelligently pinpoint malicious receiver devices when inconsistent results are recognized.

In some embodiments, the NOMA operation can explore the power domain for multi-user superposition transmission. Compared with traditional wireless communication systems for data transmission, which usually rely on the time/frequency/code domain, the NOMA operation can enable the transmitter to send the superposed signals to multiple users over the same spectrum, so that the receivers can retrieve the intended signals via sequentially successive interference cancellation.

In some embodiments, the disclosed high throughput and cyber secure communication method and system can modulate a superposed signal containing a coherence carrier that is modulated with a sample of random noise signal. The modulated multi-user superposed signal and the noise signal can be transmitted through orthogonally polarized antennas.

Referring to FIG. 1, a schematic block diagram illustrates an exemplary high throughput and cyber secure communication system in accordance with some embodiments of the present disclosure.

As illustrated, the high throughput and secure multi-user superposition communication system can include a base station 110. According to various embodiments of the present disclosure, the base station 110 can include a radio system with data communication functionality. For example, the base station 110 may be a ground command center, a command vehicle, a base station, and/or the like. The base station 110 can act as a transmitter in data transmission, and can be equipped with single or multiple transmitting antennas.

In some embodiments of the present description, the terms 'base station,' 'transmitting end,' 'transmitter,' and 'central command node' may be interchangeably used and interpreted, until otherwise stated, as having the same meaning.

As illustrated, in some embodiments, the high throughput and secure multi-user superposition communication system can include multiple user devices 130. The multiple user devices 130 can be local to each other or remote from each other. User devices 130 can be connected by one or more communication links 144 to a communications network 120 that can be linked via a communication link 142 to the base station 110.

According to various embodiments of the present disclosure, any one user 130 can be a field operation node including a distributed radio system with communication functionality. Each field operation node can act as a receiver in wireless transmission, and can be equipped with single or multiple receiving antennas.

For example, user device 130 can be implemented as a mobile device, such as a mobile phone 131, a tablet computer 133, a laptop computer 135, a vehicle (e.g., car, boat, airplane, etc.) entertainment system (not shown), a portable media player (not shown), and/or any other suitable mobile device.

As another example, in some embodiments, user device 130 can be implemented as a non-mobile device, such as a desktop computer 137, a set-top box (not shown), a smart television 139, a multimedia terminal (not shown), a streaming media player (not shown), a game console (not shown), and/or any other suitable non-mobile device. Although five user devices 131, 133, 135, 137, and 139 are shown in FIG. 1, any suitable number of user devices, and/or any suitable types of user devices, can be used in some embodiments.

In some embodiments of the present description, the terms 'user,' 'receiving end,' 'user device,' 'field operation node,' 'receiver device,' 'receiver,' and 'terminal' may be interchangeably used and interpreted, until otherwise stated, as having the same meaning.

In some embodiments, each user device 130 and base station 110 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, routers, display controllers, input devices, etc.

According to various embodiments of the present disclosure, a communications network 120 including a wired or wireless backhaul link can be used to feedback channel state information between the base station 110 and the multiple user devices 130.

Communications network 120 can be any suitable computer network or combination of networks including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), etc. Communication links 142 and 144 can be any communication links suitable for communicating data between the user devices 130 and base station 110, such as network links, dial-up links, wireless links, hard-wired links, any other suitable communication links, or any suitable combination of such links. User devices 130 and base station 110 can be located at any suitable location.

The disclosed high throughput and secure multi-user superposition communication system as shown in FIG. 1 can realize a secure multi-user superposition communication in a cyber-attack environment. In some embodiments, the high throughput and secure multi-user superposition communication system can include intelligent information collection and agile data transmission techniques that span the protocol stack network layer, link layer, and physical layer to ensure data validation and high throughput of covert multi-user communications.

Figure 2:
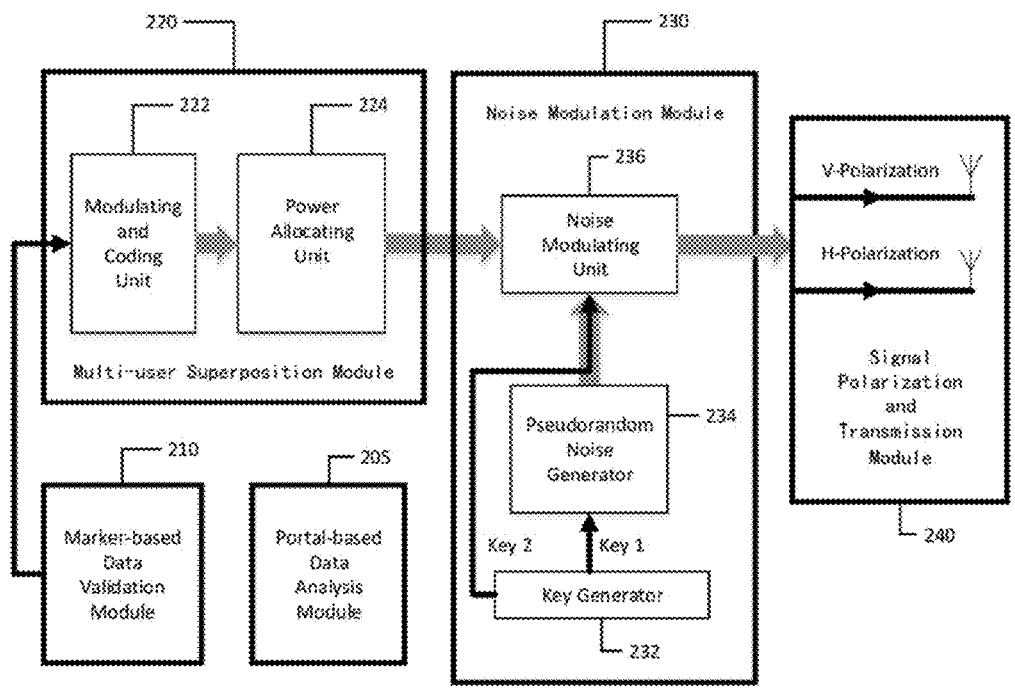
FIG. 2 illustrates a schematic block diagram of an exemplary base station of a high throughput and cyber secure communication system in accordance with some embodiments of the present disclosure.
Figure 3:
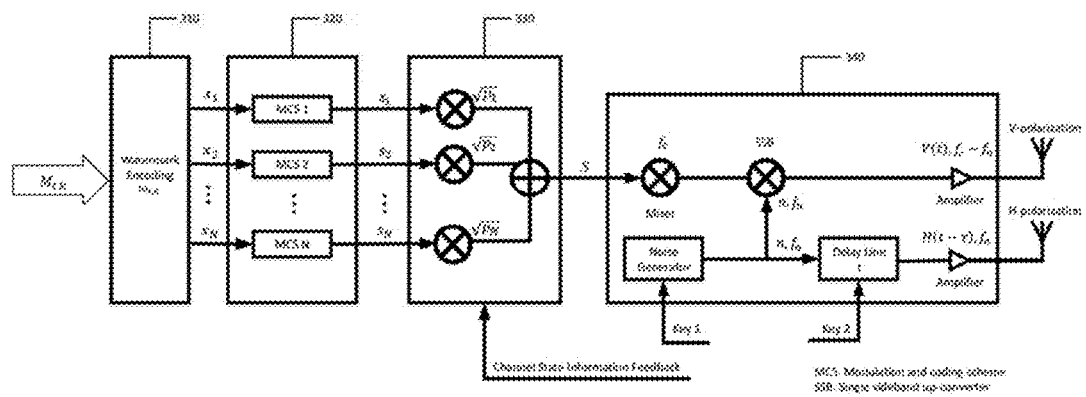
FIG. 3 illustrates a schematic flow diagram of exemplary data process flow in a base station in a high throughput and cyber secure communication system in accordance with some embodiments of the present disclosure.

Referring to FIGS. 2 and 3, a schematic block diagram illustrates an exemplary base station of a high throughput and cyber secure communication system as shown in FIG. 2 in accordance with some embodiments of the present disclosure, and an exemplary data process flow in the base station in the high throughput and cyber secure communication system as shown in FIG. 3 in accordance with some embodiments of the present disclosure.

As illustrated in FIG. 2, the base station of the disclosed high throughput and secure multi-user superposition communication system can include a portal-based data analysis module 205, a marker-based data encoding module 210, a multi-user superposition module 220, and a noise modulation module 230, and a signal polarization and transmission module 240.

To validate the originality of the transmission data, the marker-based data encoding module 210 can use a data-level intelligent technique to embed digital data inside the information package where the watermark carries unique information about the owner of the information. In some embodiments, especially when dealing with streaming large scale data, the advantages of watermark can include low cost, self-intelligence, and high efficiency. In some specific embodiments, the transmitter (e.g., sensors) can generate identical and synchronized watermarks.

Before sending the data to a receiver, the original data can be appended with data collected from the transmitter which could be randomly watermarked and then transmitted through the communication network. The watermark data can be pre-defined so that only the transmitter is aware of it. When the receiver receives data collected from the threat detection sensor, the correlation validation can be carried between the watermark and the watermarked data to detect any manipulation. As such, the disclosed high throughput and secure multi-user superposition communication system can securely store the data and intelligently verify the data integrity.

Figure 4:
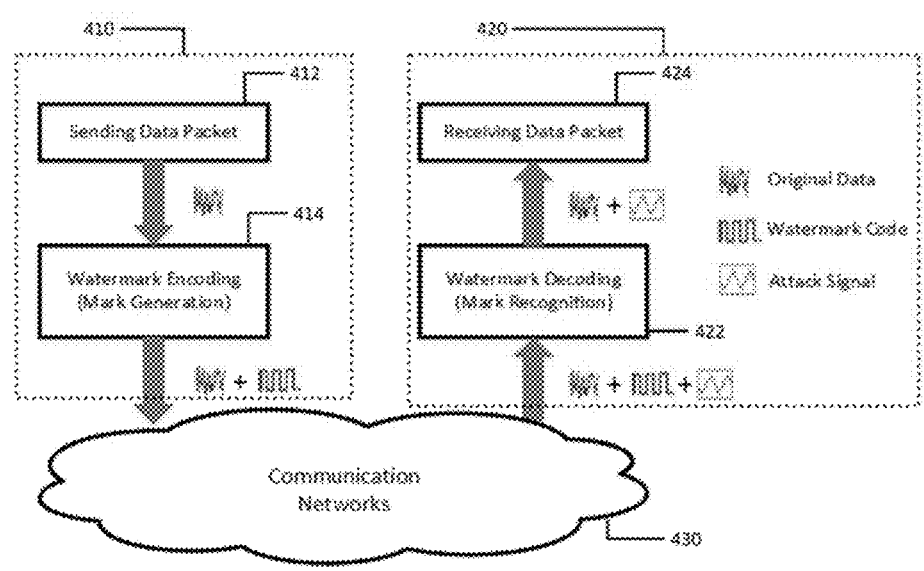
FIG. 4 illustrates a schematic block diagram illustrating an exemplary process of marker-based data validation in accordance with some embodiments of the present disclosure.

Referring to FIG. 4, a schematic block diagram illustrating an exemplary process of marker-based data validation is shown in accordance with some embodiments of the present disclosure.

As illustrated, the process of marker-based data validation can include a watermark encoding process 410 at the transmitter and a watermark decoding process 420 at the receiver.

In some embodiments, the watermark encoding process 410 can include a data packets sending operation 412 and a watermark generating operation 414. When sending data packets that only include the original data in the watermark generating operation 412, one or more watermark codes can be generated and embedded into the original data during the watermark generating operation 414.

Initially, an encoder can generate a L-chip watermark code $\omega_{t,k}$ at time t for user k's data sequence, where k=1, . . . , N from a set of N users. The values of the chip series are sequences of −1's and +1's. Watermark values can have a predefined amplitude $A_k$. Thus at any instant of time t, the watermark value can be $A_k \omega_{t,k}$, where $\omega_{t,k} \in \{-1, +1\}$.

Next, the collected traffic flow from the transmitter can be embedded with the generated watermarks. It should be noted that, any suitable method to embed marks into data flow can be applied.

In some embodiments, the watermark encoding process can be formulated as $x_k = M_{t,k} + A_k \omega_{t,k}$, where $M_{t,k}$ represents the data information for user k, which is collected from all the transmitting ends at time t.

When a chip in the watermark sequence is −1, the related transmission data unit is reduced by $A_k$. Likewise, when a chip is +1, the system increases the transmission data unit by $A_k$. The higher value is $M_{t,k} + A_k$ and the lower value is $M_{t,k} - A_k$. The value of the target data flow can be large enough for the defense system to introduce watermarks.

In some embodiments, the modulated data flow can be transmitted via the communication networks 430, such as a wireless communication network. During the data transmission process, the adversary may try to manipulate the data and disrupt watermarks. The disclose process can prevent the watermark disruption through watermark encoding.

In some embodiments, the watermark decoding process 420 can include a watermark recognizing operation 422 and a data packets receiving operation 424.

A data center at the receiver can capture the data flow transmitted from the communication networks 430, and then can divide the data flow into segments. Each segment can persist for a chip duration L. The data flow rate can be calculated as the average during each segment.

Assume that the sequence has n continuous segments, which correspond to a full period of the encoding sequence. With the knowledge of the watermark sequence before sending, the data sequence of the original data packets can be recovered by roughly as the representation: $R'_{t,k} = M_{t,k} + A_k \omega_{t,k} + B_t$, where $R'_{t,k}$ represents the received data sequence after transmission and $B_t$ is attack sequence.

The data goes next to the watermark recognizing operation 424. Noting that $W_{r,k}$ can be a locally generated watermark code at the receiver, which is identical to the watermark $\omega_t$ at the transmitter. The watermark code can be used to decode the received signal $R'_{t,k}$ after modulation, and similarity can be formulated as $S_{t,k} = R'_{t,k} \cdot W_{r,k} = (M_{t,k} + A_k \omega_{t,k} + B_t) \cdot W_{r,k}$, where '·' is the dot product operation and $W_{r,k}$ is the unit vector. When $W_{r,k} = \omega_{t,k}$ and $B_t = 0$, $W_{r,k}(\omega_{t,k})$ is designed to ensure $W_{r,k} \cdot \omega_{t,k} = 1$ and $M_{t,k} \cdot W_{r,k} = 0$, so that there is no cyber-attacks allowed during the data transmission. Hence, the original signal can be exactly recovered.

It should be noted that, the decoding data can be correlated with the original data to determine the presence or absence of watermarks. If the decoding result $S_{t,k}$ is 1, the watermark sequence is present, thus it can be determined that there is no compromised transmitter and receiver or attack launched during the transmission, and the received data packets at 424 only include the original data. If the decoding result $S_{t,k}$ is not 1, it can be determined that either there is a transmission error failure in the system or the data could have been manipulated by an opponent, so that the received data packets at 424 may include the original data and attack signals.

Turning back to FIGS. 2 and 3, after the watermark encoded data is generated by the marker-based data encoding module 210 shown in FIG. 2, which is the watermark encoding operation 310 shown in FIG. 3, where the watermark encoded data can be sent to the multi-user superposition module 220.

In some embodiments, in order to effectively serve multiple users simultaneously, the transmitter can operate a NOMA operation to explore the power domain for multi-user superposition transmission. The NOMA scheme can support multiple users on the same frequency band simultaneously, which can significantly improve the system spectral efficiency.

It should be noted that, the signal polarization and transmission module 240 of the transmitter can include one vertically polarized (v-polarization) antenna and one horizontally polarized (h-polarization) antenna, as shown in FIG. 2.

As illustrated in FIG. 2, the multi-user superposition module 220 can include a modulating and coding unit 222 and a power allocating unit 223. Assume that the number of users is denoted as N. The modulating and coding unit 222 can be used for encoding and modulating bit streams $x_k$ separately for user k, k=1, 2 . . . . . N, as shown in process 320. The modulated signal intended for receiver k is denoted as $s_k$. The power allocating unit 223 can be used for generating signal S by superposing N transmission signals $s_k$ with N distinct transmit power levels, as shown in operation 330.

In some specific embodiments, a higher transmit power can be assigned to a signal whose receiver has a lower channel gain, whereas a lower transmit power can be assigned to a signal whose receiver has a relatively higher channel gain. The composite signal S can be transmitted over the same frequency band through a polarized antenna.

Further, in operation 330, respective channel state information $h_1, h_2, \ldots, h_N$ of receivers can be obtained through a backhaul feedback link. The respective channel state information can be sorted in an increasing order. In some embodiments, without limit the scope of the present disclosure, the channel gains normalized by the noise can be ordered as $|h_1|^2/N_{0,1} < |h_2|^2/N_{0,2} < \ldots < |h_N|^2/N_{0,N}$. Then, each user k=1, 2, . . . , N can be assigned a transmit power with the order of $p_1 > p_2 > \ldots > p_N$, where $\Sigma_{k=1}^{N} p_k = P$, and P is the total transmit power. Accordingly, power allocation may be optimized in equation (1):

$$\{p_1, p_2, \ldots, p_N\} = \arg\max_{p_1, p_2, \ldots, p_N} (R_1 + R_2 + \ldots + R_N),  \quad (1)$$

which is subject to $\Sigma_{k=1}^{N} p_k = P$, and $p_1 > p_2 > \ldots > p_N$.

By dynamically selecting the transmission power, the superposed signal $S = \sqrt{p_1} s_1 + \sqrt{p_2} s_2 + \ldots \sqrt{p_N} s_N$ can be constructed after operation 330, where $s_k$, k=1, . . . , N, represents the modulated signal for group user k.

Next, the superposed signal S can be sent to the noise modulation module 230 as shown in FIG. 2. As illustrated, the noise modulation module 230 can include a key generator 232, a pseudorandom noise generator 234, and a noise modulating unit 236.

Referring to operation 340 shown in FIG. 3, the superposed signal S can be mixed with the carrier frequency of $f_c$. The signal can be further used as a local oscillator of a single sideband (SSB) up-converter and mixed with a band-limited Gaussian noise with the center frequency $f_n$.

The band-limited Gaussian noise can be intelligently generated by Key 1 at the key generator 232 shown in FIG. 2. The lower sideband that is centered at $f_c - f_n$ can be selected from the mixed signal, which is denoted as V(t). As illustrated in FIG. 3, V(t) as a noise-like signal can be transmitted through a vertically polarized antenna in the signal polarization and transmission module 240.

Concurrently, the band-limited noise can be connected with a delay line with a predetermined and controllable delay τ, which is generated by Key 2 at the key generator 232 shown in FIG. 2. As illustrated in FIG. 3, the delayed noise signal, which is denoted as H(t–τ), can be transmitted through a horizontally polarized antenna in the signal polarization and transmission module 240.

By choosing the carrier frequency $f_c = 2f_n$, it can be ensured that the vertically polarized signal is centered at $f_n$, and in the same range as the reference horizontally polarized signal.

Further, in some embodiments, the base station can include a portal-based data analysis module 205, as shown in FIG. 2. Before transmitting the data flows to the multiple receivers, the portal-based data analysis module 205 can cooperate with multiple portal-based data attestation modules in the multiple receivers to perform a portal-based data attestation process for determining whether any receiver is compromised or manipulated.

Figure 7:
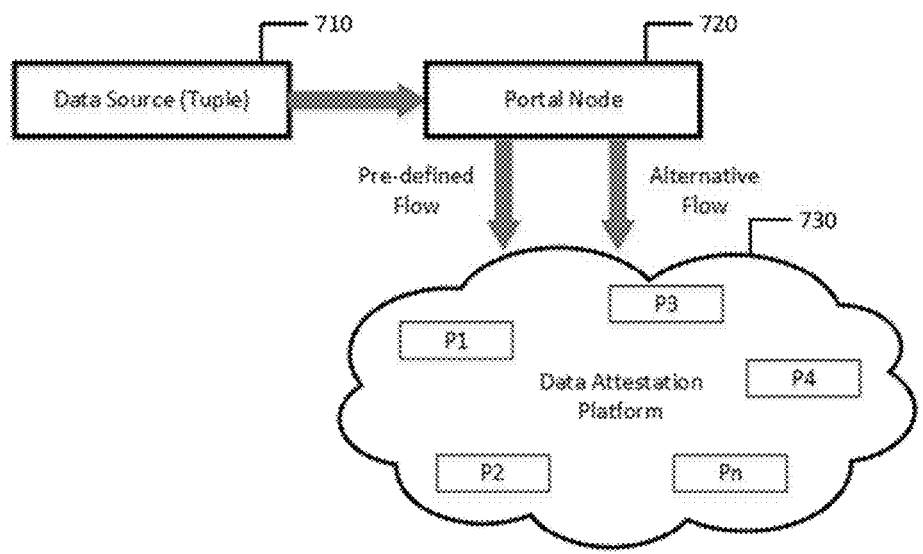
FIG. 7 illustrates an schematic block diagram of an exemplary portal-based data attestation (PDIA) process at a receiver in a high throughput and cyber secure communication system in accordance with some embodiments of the present disclosure.

Referring to FIG. 7, a schematic block diagram of an exemplary portal-based data attestation (PDIA) process in a high throughput and cyber secure communication system is shown in accordance with some embodiments of the present disclosure.

In some embodiments, the portal-based data attestation (PDA) process can be applied remotely between a transmitter and multiple receivers. The PDA process can be used as a system level intelligent management technique in multi-party systems to expose dishonest or malicious parties.

In some embodiments, the remote attestation can use a challenge-response scheme to detect malicious behavior. System-level attestation can ensure that a remote software platform is running code, which is not compromised or altered by the adversary. In some specific embodiments, a low-cost data attestation mechanism can be used to dynamically and intelligently verify the integrity of data processing results, and to pinpoint malicious nodes when inconsistent results are recognized.

In some embodiments, portions of original data can be replicated at the transmitter. The replicated data can then be reassigned to a remote computation platform including multiple of receivers for consistency checking.

At the transmitter, the portal-based data analysis module 205 can include a data source 710 and a portal node 720 to conduct the data attestation generation and distribution respectively. The data source 710 can be deployed to dynamically generate original testing data, or to obtain original testing data from a third party. The portal node 720 can be configured to distribute the testing dataflow and construct an intelligent attestation test.

In some embodiments, a tuple d from the data source 710 and a duplicate d' can be sent to a data attestation platform 730. The data attestation platform 730 can include a number n of receivers, and each receiver can include a portal-based data attestation module for operating one or more data processing functions.

The portal node 720 can send the tuple d to a pre-defined dataflow path $p_1 \rightarrow p_2 \rightarrow p_3 \ldots \rightarrow p_n$ providing functions $f_1 \rightarrow f_2 \rightarrow f_3 \ldots \rightarrow f_n$, where $p_i$ is a portal-based data attestation module of one receiver in the data attestation platform 730, and $f_i$ is a data processing function operated by the portal-based data attestation module of one receiver $p_i$. Then, the portal node 720 can send a duplicate d' to an alternative flow $p'_1 \rightarrow p'_2 \rightarrow p'_3 \ldots \rightarrow p'_n$, where $p'_i$ provides the same data processing function $f_i$ as $p_i$.

After receiving the attestation results, the portal node 720 can compare each intermediate result between pairs of nodes $p_1$ and $p'_1$. If $p'_1$ and $p_1$ receive the same data, but produce different output results, it can be determined that $p_1$ and $p'_1$ are inconsistent with function $f_i$. Otherwise, it can be determined that $p_1$ and $p'_1$ are consistent with function $f_i$. As such, it can be easily determined whether any receiver is compromised or manipulated via a wireless communication network.

In response to determine which one or more receivers are compromised or manipulated, the transmitter can be informed the identifications of the one or more receivers. As such, the transmitter can reject to distribute the keys (e.g., the noise frequency Key 1 and the delay line Key 2 as shown in FIG. 3) with the one or more receivers. Without the keys, the one or more receivers that are compromised or manipulated cannot decode the original information transmitted from the base station.

Figure 5:
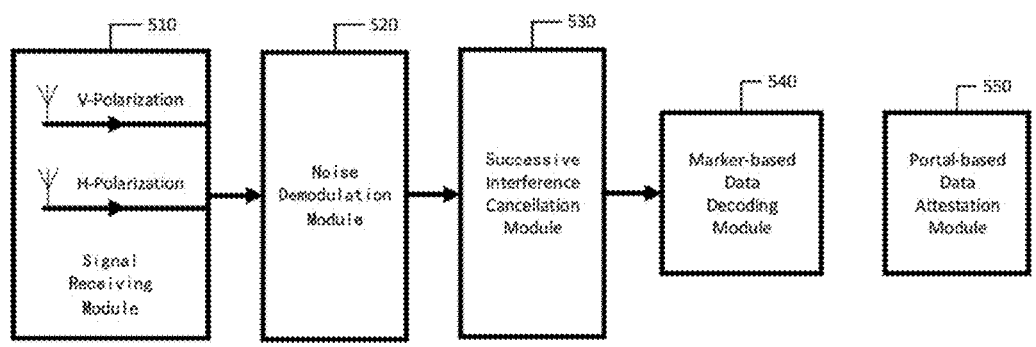
FIG. 5 illustrates a schematic block diagram of an exemplary receiver of a high throughput and cyber secure communication system in accordance with some embodiments of the present disclosure.
Figure 6:
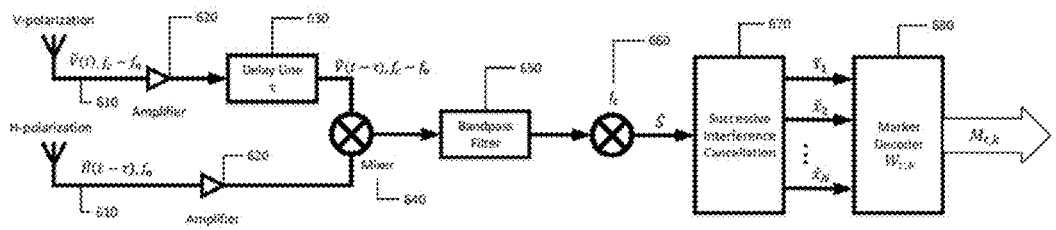
FIG. 6 illustrates a schematic flow diagram of exemplary data process flow in a receiver in a high throughput and cyber secure communication system in accordance with some embodiments of the present disclosure.

Referring to FIGS. 5 and 6, a schematic block diagram illustrates an exemplary receiver of a high throughput and cyber secure communication system is shown in FIG. 5 in accordance with some embodiments of the present disclosure, and an exemplary data process flow in the receiver in the high throughput and cyber secure communication system is shown in FIG. 6 in accordance with some embodiments of the present disclosure.

As illustrated in FIG. 5, each receiver can include a signal receiving module 510, a noise demodulation module 520, a successive interference cancellation module 530, a marker-based data decoding module 540, and a portal-based data attestation module 550.

In some embodiments, the signal receiving module 510 can include orthogonally polarized receiving antennas and corresponding amplifiers. In some embodiments, one vertically polarized (v-polarization) antenna and one horizontally polarized (h-polarization) antenna for receiving the vertically polarized signal and the horizontally polarized signal.

After receiving the vertically polarized signal and the horizontally polarized signal in operation 610 as shown in FIG. 6, the received vertically polarized signal and the horizontally polarized signal can be amplified in operation 620.

Next, the amplified signals can pass through the noise demodulation module 520 for information recovery. The noise demodulation module 520 can include a delay line, one or more mixers, and a bandpass filter.

As shown in FIG. 6, the amplified vertically polarized signal $\tilde{V}(t)$ can be first passed through a delay line in operation 630 with the exact same delay time $\tau$ as the amplified horizontally polarized signal. As such, two orthogonally polarized signals $\tilde{H}(t-\tau)$ and $\tilde{V}(t-\tau)$ are able to be synchronized.

If the delay does not exactly match the corresponding transmit delay, then no message can be extracted from the noise-modulated signal. Hence, only a friendly receiver knows the exact value of the delay time. Any adversary without knowledge of the delay value will not able to perform the proper correlation to decode the hidden message.

By mixing the two orthogonally polarized signals $\tilde{H}(t-\tau)$ and $\tilde{V}(t-\tau)$ together in operation 640, a mixed signal can pass through a bandpass filter in operation 650. The sum frequency component can be obtained and can be centered at $f_c=2f_n$ in operation 660. After demodulation, the signal $\tilde{S}$ can include of all the users' information.

Next, the signal $\tilde{S}$ can go through the successive interference cancellation (SIC) modulation 530 to decode the data for each user sequentially.

In some embodiments, in operation 670 as shown in FIG. 6, the decoding order can be in the order of increasing $|h_k|^2/N_{0,k}$, k=1, 2, . . . , N. Each receiver can first detect the strongest signal by regarding the other weaker signals as interference. Then the decoded signal can be subtracted from the composite signal, and the same procedure can be repeated until the intended signal is retrieved. Based on such order, each user is able to decode and remove the signals intended for other users whose decoding order in the SIC process comes before.

In some specific embodiments, for the k-th user with $|h_k|^2/N_{0,k}$, user k can first decode the signals intended for user 1 to user k−1 sequentially, and then can subtract components $s_1$ to $s_{k-1}$ from the received signal S before decoding its own signal $s_k$. For the first user, interference cancellation may not be performed since the signal component of the first user comes first in the decoding order. The N-th user can be the last one to decode, so the interference cancellation can be performed for all other users before decoding the signal component for the N-th user.

It should be noted that, the throughput is the same as the single-user transmission capacity. The aggregated throughput of N users is expressed in equation (2):

$$R_{sum} = \sum_{k=1}^{N} R_k = R_1 + R_2 + \ldots + R_N \qquad (2)$$

$$= \frac{p_1|h_1|^2}{\sum_{k=2}^{N} p_k|h_k|^2 + N_{0,1}} + \frac{p_2|h_2|^2}{\sum_{k=3}^{N} p_k|h_k|^2 + N_{0,2}} + \ldots + \frac{p_N|h_N|^2}{N_{0,N}},..$$

Next, the decoded signals $\tilde{s}_k$ separately for user k, k=1,2, . . . , N, can go through the marker decoder in the marker-based data recoding module 540 to check whether an opponent may manipulate the data and disrupt watermarks during data transmission in operation 680. The details of operation 680 for watermark decoding can be referred to the above description in connection with FIG. 4.

Further, the receiver can also include a portal-based data attestation module 550 to further expose dishonest or malicious parties through changes in the data transmission. The detailed function of the portal-based data attestation module 550 can be referred to the above description in connection with FIG. 7

Figure 8:
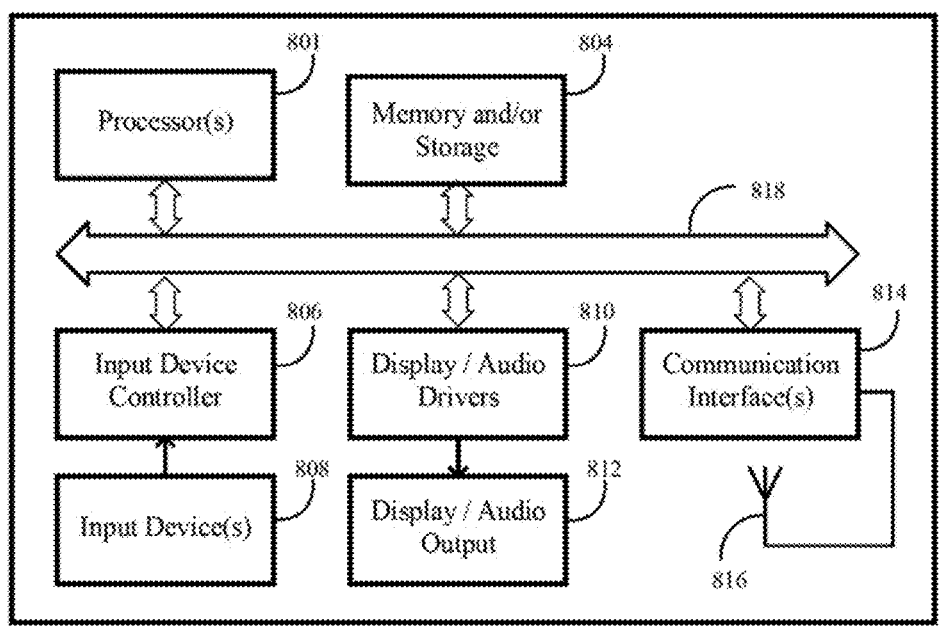
FIG. 8 is a schematic diagram of exemplary hardware of a base station or a receiver in a high throughput and cyber secure communication system in accordance with some embodiments of the present disclosure.

Referring to FIG. 8, a schematic diagram of exemplary hardware of a base station or a receiver in a high throughput and cyber secure communication system is shown in accordance with some embodiments of the present disclosure.

As illustrated, the hardware can include at least one hardware processor 801, memory and/or storage 804, an input device controller 806, an input device 808, display/audio drivers 810, display and audio output circuitry 812, communication interface(s) 814, one or more antennas 816, a bus 818, and any other suitable components, such as one or more mixers, one or more amplifiers as shown in FIGS. 3 and 6.

The at least one hardware processor 801 can include any suitable hardware processor(s), such as microprocessor, micro-controller, a central process unit, graphics processing unit, digital signal processor, array processor, vector processor, dedicated logic, and/or any other suitable circuitry for controlling the functioning of a general purpose computer or special purpose computer in some embodiments.

In some embodiments, the at least one hardware processor 801 can implement or execute various embodiments of the present disclosure including one or more method, operations and block/logic diagrams. For example, as described above in connection with FIGS. 2-7, the at least one hardware processor 801 can perform at least some of the steps/operations and/or functions of the modules, etc.

The steps/operations of the disclosed method in various embodiments can be directly executed by a combination of the at least one hardware processor 801 and one or more software modules. The one or more software modules may reside in any suitable storage/memory medium, such as a random access memory, a flash memory, a read-only memory, a programmable read-only memory, an electrically erasable programmable memory, a register, etc. The storage medium can be located in the memory and/or storage 804. The at least one hardware processor 801 can implement the steps/operations of the disclosed method by combining the hardware and the information read from the memory and/or storage 804.

The memory and/or storage 804 can be any suitable memory and/or storage for storing programs, data, media content, comments, information of users and/or any other suitable content in some embodiments. For example, memory and/or storage 804 can include random access memory, read only memory, flash memory, hard disk storage, optical media, and/or any other suitable storage device.

The input device controller 806 can be any suitable circuitry for controlling and receiving input from one or more input devices 808 in some embodiments. For example, input device controller 806 can be circuitry for receiving input from a touch screen, from one or more buttons, from a voice recognition circuit, from a microphone, from a camera, from an optical sensor, from an accelerometer, from a temperature sensor, from a near field sensor, and/or any other suitable circuitry for receiving user input.

The display/audio drivers 810 can be any suitable circuitry for controlling and driving output to one or more display and audio output circuitries 812 in some embodiments. For example, display/audio drivers 810 can be circuitry for driving an LCD display, a speaker, an LED, and/or any other display/audio device.

The communication interface(s) 814 can be any suitable circuitry for interfacing with one or more communication networks. For example, interface(s) 814 can include network interface card circuitry, wireless communication circuitry, and/or any other suitable circuitry for interfacing with one or more communication networks. In some embodiments, communication network can be any suitable combination of one or more wired and/or wireless networks such as the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), a WiFi network, a WiMax network, a satellite network, a mobile phone network, a mobile data network, a cable network, a telephone network, a fiber optic network, and/or any other suitable communication network, or any combination of any of such networks.

The one or more antennas 816 can be any suitable one or more antennas for wirelessly communicating with a communication network in some embodiments. For example, as shown in FIGS. 2-3 and 5-6, the one or more antennas 816 can include one vertically polarized (v-polarization) antenna and one horizontally polarized (h-polarization) antenna for transmitting or receiving the vertically polarized signals and the horizontally polarized signals.

The bus 818 can be any suitable mechanism for communicating between two or more of components 801, 804, 806, 810, and 814 in some embodiments. The bus 818 may be an Industry Standard Architecture (ISA) bus, a Peripheral Component Interconnect (PCI) bus, an Expended-ISA (EISA) bus, or any other suitable bus. The bus 818 can be divided into an address bus, a data bus, a control bus, etc. The bus 818 is represented as a two-way arrow in FIG. 8, but it does not mean that it is only one type bus or only one bus.

Any other suitable components not shown in FIG. 8, such as one or more mixers, one or more amplifiers as shown in FIGS. 3 and 6, can be included in the hardware in accordance with some embodiments. Any unnecessary components shown in FIG. 8 may also be omitted in the hardware in accordance with some other embodiments.

In some embodiments, some portions of the data flow diagrams and block diagrams in the figures illustrate various embodiments of the disclosed method and system, as well as some portions of architectures, functions and operations that can be implemented by computer program products. In this case, some blocks of the data flow diagrams or block diagrams may represent a module, a code segment, a portion of program code. Each module, each code segment, and each portion of program code can include one or more executable instructions for implementing predetermined logical functions.

It should also be noted that, each block in the block diagrams and/or data flow diagrams, as well as the combinations of the blocks in the block diagrams and/or data flow diagrams, can be realized by a dedicated hardware-based system for executing specific functions, or can be realized by a dedicated system combined by hardware and computer instructions.

It should also be noted that, in some alternative implementations, the functions illustrated in the blocks be executed or performed in any order or sequence not limited to the order and sequence shown and described in the figures. For example, two consecutive blocks may actually be executed substantially simultaneously where appropriate or in parallel to reduce latency and processing times, or even be executed in a reverse order depending on the functionality involved in.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, and/or any other suitable media), optical media (such as compact discs, digital video discs, Blu-ray discs, and/or any other suitable optical media), semiconductor media (such as flash memory, electrically programmable read only memory (EPROM), electrically erasable programmable read only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

The provision of the examples described herein (as well as clauses phrased as "such as," "e.g.," "including," and the like) should not be interpreted as limiting the claimed present disclosure to the specific examples; rather, the examples are intended to illustrate only some of many possible aspects.

Accordingly, a high throughput and cyber secure communication method, and a high throughput and cyber secure communication system are provided.

In some embodiments, the disclosed high throughput and cyber secure communication method and system can use a noise-like transmit signal to increase the difficulty for linearly polarized receivers to identify, decode, or extract useful information from the signal. Hence, the disclosed high throughput and secure multi-user superposition communication system can immune from interference and jamming caused during linearly polarized signal transmissions as these signals are rejected during the receiver correlation process. In some embodiments, dispersive effects caused by the transmission medium can be minimized since that both vertical and horizontal polarization channels operating over the same frequency band are identically affected.

For security, without the knowledge of modulation schemes and power allocation ratio, any third-party that intercepts the composite signal cannot decode it successfully. Thus, the disclosed high throughput and secure multi-user superposition communication system can intelligently choose modulation schemes and power ratios for different users to increase the difficulty of being intercepted. Moreover, some embodiments of the disclosed method and system for protecting commercial, military, or private communications may shift the emphasis from point-to-point/peer-to-peer to a multi-user transmission network. Therefore, the disclosed high throughput and secure multi-user superposition communication method and system can make multi-user communication possible in a secure and spectrally efficient approach.

Although the present disclosure has been described and illustrated in the foregoing illustrative embodiments, it is understood that the present disclosure has been made only by way of example, and that numerous changes in the details of embodiment of the present disclosure can be made without departing from the spirit and scope of the present disclosure, which is only limited by the claims which follow. Features of the disclosed embodiments can be combined and rearranged in various ways. Without departing from the spirit and scope of the present disclosure, modifications, equivalents, or improvements to the present disclosure are understandable to those skilled in the art and are intended to be encompassed within the scope of the present disclosure.

What is claimed is:

1. A method for transmitting data, comprising:
    performing a marker-based data encoding process to embed a digital watermark into each of a plurality of original data flows to be transmitted to a plurality of receivers respectively;
    performing a non-orthogonal multiple access process to allocate transmission powers to the plurality of original data flows, such that the plurality of original data flows are be superposed on a carrier frequency simultaneously to generate a superposed signal;
    performing a noise modulation process to modulate the superposed signal to generate a signal of noise and a reference noise signal;
    transmitting the signal of noise and the reference noise signal through orthogonally polarized antennas; and
    performing a portal-based data integrity analysis process to check whether a receiver in the plurality of receivers is compromised or manipulated.

2. The method of claim 1, wherein the marker-based data encoding process includes:
    generating the digital watermark including an identical watermark and a synchronized watermark for each of the plurality of original data flows; and
    embedding the digital watermark at random time instants into one corresponding original data flow of the plurality of original data flows.

3. The method of claim 1, wherein the non-orthogonal multiple access process includes:
    clustering the plurality of receivers with a plurality of channel gains;
    calculating channel gain differences based on the plurality of channel gains;
    allocating the transmission powers to the plurality of receivers using the channel gain differences; and
    generating the superposed signal based on the transmission powers;
    wherein the plurality of channel gains of the plurality of receivers are respectively normalized by a corresponding channel noise, and the transmission power allocated to each of the plurality of receivers is inversely proportional to the corresponding channel gain normalized by the corresponding channel noise.

4. The method of claim 1, wherein the noise modulation process includes:
    generating a band-limited Gaussian noise characterized by a first key;
    using a power divider to split the band-limited Gaussian noise into a first noise and a second noise;
    modulating the superposed signal with the first noise to obtain the signal of noise; and
    using a second key to delay the second noise to obtain the reference noise signal.

5. The method of claim 1, wherein transmitting the signal of noise and the reference noise signal includes:
    broadcasting the signal of noise on a first frequency to the plurality of receivers through a first polarized antenna; and
    broadcasting the reference signal at a second frequency to the plurality of receivers through a second polarized antenna;
    wherein the first frequency is different from the second frequency, and a signal polarization direction of the first polarized antenna is perpendicular to a signal polarization direction of the second polarized antenna.

6. The method of claim 1, wherein the portal-based data integrity analysis process includes:
    deploying a data source to dynamically generate original testing data;
    configuring a portal node to distribute the original testing data;
    sending a first portion the original testing data via the portal node through a first flow path including the plurality of receivers arranged in a first queue;
    sending a second portion of the original testing data to a second flow path including the plurality of receivers arranged in a second queue, wherein the second portion of the original testing data is a duplication of the first portion of the original testing data, and a pair of corresponding receivers that have a same serial number in the first flow path and the second flow path which share a same data processing function;
    comparing intermediate data process results between each pair of corresponding receivers; and
    determining whether one receiver in the plurality of receivers is compromised or manipulated based on the comparison results.

7. A method for receiving data, comprising:
    receiving a signal of noise and a reference noise signal through orthogonally polarized antennas;
    performing a noise demodulation process to recover a superposed signal from the signal of noise and a reference noise signal, wherein the superposed signal includes a plurality of data flows for a plurality of receivers superposed on a carrier frequency;
    performing a successive interference cancellation process to decode an intended data flow for a receiver of the plurality of receivers;
    performing a marker-based data decoding process to check correlation validation by using the intended data flow and a digital watermark; and performing a portal-based data integrity attestation process to initiate a data processing function for checking whether the receiver is compromised or manipulated.

8. The method of claim 7, wherein receiving the signal of noise and the reference noise signal includes:
receiving the signal of noise on a first frequency through a first polarized antenna and amplifying the signal of noise; and
receiving the reference signal at a second frequency through a second polarized antenna and amplifying the reference signal;
wherein the first frequency is different from the second frequency, and a signal polarization direction of first polarized antenna is perpendicular to a signal polarization direction of second polarized antenna.

9. The method of claim 7, wherein the noise demodulation process includes:
synchronizing the signal of noise and the reference noise signal with a pre-defined delay time parameter to obtain a mixed signal; and
retrieving a sum frequency component from the mixed signal to recover the superposed signal.

10. The method of claim 7, wherein the successive interference cancellation process includes:
decoding the superposed signal in a ranking order of a plurality of channel gains normalized by a corresponding channel noise;
subtracting a decoded signal component from the superposed signal; and
treating other signal components based on the ranking order as interference.

11. The method of claim 7, wherein the marker-based data decoding process includes:
performing a watermark recognizing operation to decode the intended data flow by using the digital watermark; and
checking a correlation validation between the decoded intended data flow and an original data flow to determine whether the intended data flow is manipulated.

12. The method of claim 7, wherein the portal-based data integrity attestation process includes:
receiving first input testing data from a first previous node in a first flow path;
receiving a second input testing data from a second previous node in a second flow path;
performing a first data processing function based on the first input testing data to generate first output testing data;
performing a second data processing function based on the second input testing data to generate second output testing data;
sending the first output testing data to a first next node in the first flow path; and
sending a second input testing data from a second next node in the second flow path.

13. A system comprising:
at least one receiver, configured to:
receive a signal of noise and a reference noise signal through orthogonally polarized receiving antennas;
perform a noise demodulation process to recover a superposed signal from the signal of noise and a reference noise signal, wherein the superposed signal includes a plurality of data flows for a plurality of receivers superposed on a carrier frequency;
perform a successive interference cancellation process to decode an intended data flow for one of the plurality of receivers;
perform a marker-based data decoding process to check correlation validation by using the intended data flow and the first digital watermark; and
perform a portal-based data integrity attestation process to operate a data processing function for checking whether the receiver is compromised or manipulated.

14. The system of claim 13, wherein:
the at least one receiver is further configured to:
receive the signal of noise on a first frequency through a first polarized receiving antenna and amplifying the signal of noise, and
receive the reference signal at a second frequency through a second polarized receiving antenna and amplifying the reference signal,
wherein the first frequency is different from the second frequency, and a signal polarization direction of the first polarized receiving antenna is perpendicular to a signal polarization direction of the second polarized receiving antenna; and
the noise demodulation module is further configured to:
synchronize the signal of noise and the reference noise signal with a pre-defined delay time parameter to obtain a mixed signal, and
retrieve a sum frequency component from the mixed signal to recover the superposed signal.

15. The system of claim 13, wherein:
the at least one receiver is further configured to:
decode the superposed signal in a ranking order of a plurality of channel gains normalized by a corresponding channel noise respectively,
subtract a decoded signal component from the superposed signal, and
treat other signal components based on the ranking order as interference; and
the marker-based data decoding module is further configured to:
perform a watermark recognizing operation to decode the intended data flow by using the first digital watermark, and
check a correlation validation between the decoded intended data flow and an original data flow to determine whether the intended data flow is compromised or manipulated.

16. The system of claim 13, wherein the at least one receiver is further configured to:
receive the first input testing data from a first previous node in the first flow path;
receive a second input testing data from a second previous node in a second flow path;
perform a first data processing function based on the first input testing data to generate a first output testing data;
perform a second data processing function based on the second input testing data to generate a second output testing data;
send the first output testing data to a first next node in the first flow path; and
send the second input testing data from a second next node in the second flow path.

17. The system of claim 13 further includes a transmitter, configured to:
perform a marker-based data encoding process to embed a digital watermark into each of the plurality of original data flows to be transmitted to the plurality of receivers respectively;
perform a non-orthogonal multiple access process to allocate transmission powers to the plurality of original data flows, such that the plurality of original data flows are simultaneously superposed on the carrier frequency to generate the superposed signal;
perform a noise modulation process to modulate the superposed signal to generate the signal of noise and the reference noise signal;
transmit the signal of noise and the reference noise signal through orthogonally polarized antennas; and
perform a portal-based data integrity analysis process to check whether a receiver in the plurality of receiver is compromised or manipulated.

18. The system of claim 17, wherein:
the transmitter is further configured to:
  generate the digital watermark including an identical watermark and a synchronized watermark for each of the plurality of original data flows, and
  embed the digital watermark at random time instants into one corresponding original data flow of the plurality of original data flows;
the multi-user superposition module is further configured to:
  cluster the plurality of receivers with the plurality of channel gains,
  calculate channel gain differences base on the plurality of channel gains,
  allocate the transmission powers to the plurality of receivers using the channel gain differences, and
  generate the superposed signal based on the transmission powers,
  wherein the plurality of channel gains of the plurality of receivers are respectively normalized by a corresponding channel noise, and the transmission power allocated to each of the plurality of receivers is inversely proportional to the corresponding channel gain normalized by the corresponding channel noise.

19. The system of claim 17, wherein:
the transmitter is further configured to:
  generate a band-limited Gaussian noise characterized by a first key,
  use a power divider to split the band-limited Gaussian noise in to a first noise and a second noise,
  modulate the superposed signal with the first noise to obtain the signal of noise, and
  use a second key to delay the second noise to obtain the reference noise signal; and
the signal polarization and transmission module is further configured to:
  broadcast the signal of noise on the first frequency to the plurality of receivers through a first polarized transmitting antenna, and
  broadcast the reference signal at the second frequency to the plurality of receivers through a second polarized transmitting antenna,
  wherein the first frequency is different from the second frequency, and a signal polarization direction of the first polarized transmitting antenna is perpendicular to a signal polarization direction of the second polarized transmitting antenna.

20. The system of claim 17, wherein the transmitter is further configured to:
deploy a data source to dynamically generate original testing data;
configure a portal node to distribute the original testing data;
send a first portion the original testing data via the portal node to the first flow path including the plurality receivers arranged in a first queue;
send a second portion of the original testing data to the second flow path including the plurality of receivers arranged in a second queue, wherein the second portion of the original testing data is a duplication of the first portion of the original testing data, and a pair of corresponding receivers that have a same serial number in the first flow path and the second flow path respectively share a same data processing function;
compare intermediate data process results between each pair of corresponding receivers; and
determine whether one receiver in the plurality of receivers is compromised or manipulated based on the comparison results.

* * * * *